United States Patent Office 3,331,803
Patented July 18, 1967

3,331,803
POLYESTER PLASTICIZER FOR POLYMERS OF VINYL CHLORIDE AND PROCESS FOR PREPARING THE SAME
Franz Blaschke, Witten (Ruhr), Germany, assignor to Chemische Werke Witten G.m.b.H., Witten (Ruhr), Germany
No Drawing. Filed July 21, 1966, Ser. No. 566,771
Claims priority, application Germany, July 31, 1961, C 24,754
14 Claims. (Cl. 260—31.6)

This is a continuation-in-part of copending United States application Ser. No. 202,178, filed June 13, 1962.

This invention relates in general to plasticizers for use with polymers of vinyl chloride, and more specifically, to polyester plasticizers which can be used without extenders therefor.

It is conventional to incorporate in vulcanizable elastomers of synthetic rubbers, such as copolymers of conjugated diolefinic hydrocarbons with monomers such as vinyl chloride, acrylonitrile and vinyl acetate, a plasticizer comprising a linear polyester (Canadian Patent No. 447,049). Among the various linear polyesters employed are those prepared by reacting a polyfunctional acid, such as sebacic, glutaric, and azelaic with a dihydric alcohol, such as butylene glycol and hexamethylene glycol. The resultant polyesters are, however, non-crystalline above 30° C. and are liquid, highly viscous and exhibit poor processability with polyvinyl chloride. Moreover, such polyesters, if they contain 1,4-butanediol or 1,6-hexanediol as the diol component, are incompatible with polyvinyl chloride and copolymers of vinyl chloride having molecular weights of less than 8,000.

It is also known to incorporate into vinyl resin compositions various polyester plasticizers produced by the reaction of polyfunctional acids, such as sebacic and azelaic acid with polyhydric alcohols, such as butanediol-1,4, and hexamethylene glycol (U.S. Patent No. 3,091,597). The polyester plasticizers described, however, cannot be used as the sole plasticizing agent because of their generally inadequate solvating action, and it is necessary to employ in combination therewith plasticizer extenders. Normally, large amounts of the plasticizer extender are not compatible with the vinyl resin composition to which it is added, and it is therefore desirable to provide a polyester plasticizer which can be used alone without a concomitant extender therefor. Moreover, the above-described polyesters of sebacic or azelaic acid with butanediol-1,4 or hexanediol-1,6 having molecular weights of from 3,500 to 8,000 are found to be incompatible with polymers of vinyl chloride.

It is therefore a principal object of this invention to provide plasticizers which are compatible with polymers of vinyl chloride.

It is yet another object of this invention to provide improved hydroxypolyester plasticizers which can be used without an extender therefor with polymers of vinyl chloride.

Still another object of the invention is to provide polyester plasticizers for polymers of vinyl chloride which are crystalline above 30° C.

Another object of the present invention is to provide a process for preparing the above-described polyester plasticizer.

These and other objects and advantages of the present invention will become more apparent to those skilled in the art by reference to the following description and claims appended hereto.

To attain these objects, it has been unexpectedly found that plasticization of polymers of vinyl chloride can be achieved with polyesters having molecular weights between 20,000 and 80,000, preferably between 30,000 and 50,000, which are produced by the reaction between a polyfunctional acid selected from the group consisting of sebacic acid, azelaic acid, and mixtures thereof, and a polyhydric alcohol selected from the group consisting of 1,4-butanediol, 1,6-hexanediol and mixtures thereof.

The above-described polyester plasticizers are solid and crystalline above about 30° C. and generally between about 45° and 110° C., depending upon the molecular weight thereof.

The hydroxypolyester plasticizers of the present invention provide the following advantages:

(a) Vinyl chloride polymers plasticized therewith possess good mechanical values, for example, high strength at low temperatures.

(b) High stability of the plasticized masses, i.e., little or no phase separation.

(c) The plasticizers are solid and are readily miscible with polyvinyl chloride and vinyl chloride copolymers.

(d) Excellent resistance of the plasticized masses against extracting substances, such as mineral and vegetable oils, hydrocarbons, etc.

(e) Low volatility of the plasticizer from vinyl chloride sheets or films plasticized therewith.

(f) Vinyl chloride polymers plasticized therewith are both odorless and tasteless.

Unlike the plasticizers described in U.S. Patent No. 3,091,597, the polyester plasticizers of the present invention have a particularly high solvating action on polymers of vinyl chloride and can therefore be advantageously used without the concomitant use of a plasticizer extender. For example, the polyesters of the present invention are compatible in all proportions with polymers of vinyl chloride, and satisfactory plasticization thereof can be obtained when using even up to 40% by weight of the polyester plasticizer. Although finite amounts of the polyesters described herein produced a finite degree of plasticization of polymers of vinyl resin, it is desirable to incorporate, as an example, from 0.4–3 moles, preferably 0.6–1.6 moles, of polyester per mole of vinyl resin, with polyvinyl chloride having an average molecular weight of about 90,000 and a K value of 70.

The polyesters suitable for use as plasticizers herein can be produced by reacting one mole of dicarboxylic acid selected from the group consisting of sebacic acid, azelaic acid and mixtures thereof with 1.5 to 3 moles, preferably 1.8 to 2.0 moles, of a diol selected from the group consisting of 1,4-butanediol, 1,6-hexanediol and mixtures thereof. The reaction is conducted in the presence of a catalyst such as, for example, zinc chloride, tetrabutyl titanate, tetrabutyl zirconate and the like, in an amount of from 0.01 to 0.001 mole of catalyst per mole of dicarboxylic acid. Desirably, the reaction is conducted at a temperature of from about 150° to 220° C., preferably 170° to 225° C., and under normal pressure. The esterification reaction is desirably carried out until the acid number of the resulting polyester reaches about 1 to 7, whereupon the reaction is terminated. The catalyst is not separated therefrom.

The thus-produced polyesters are then polycondensed at temperatures of from 225° to 275° C., preferably 250° to 270° C. and at pressures ranging between 2 to 0.01, preferably 0.5 to 0.1 mm. of mercury.

The polyesters produced in this manner exhibit a melting point of about 45° to 110° C. and are solid and crystalline. Generally, these polyesters have terminal hydroxyl groups and are thus designated herein as hydroxypolyesters.

In practice, the polycondensation reaction is terminated when the viscosity number $(Z\eta)_{c=1}$ of the polyesters, reduced to the concentration 1, is between 1.2 and 3.0, corresponding to a molecular weight between 20,000 and 80,000. The viscosity number is expressed by the formula $$Z(\eta)_{c=1} = \eta_{sp}/c$$

wherein $\eta_{sp}$ is the measured specific viscosity and $c$ the concentration of the polyester in the solvent in grams per 100 cc. In this determination there is used a 1% by weight solution of the polyester in a phenol-tetrachloroethane mixture in a weight ratio of 60 to 40 at 25° C. The specific viscosity $$\eta_{sp} = \frac{t_1}{t_0} - 1$$

is calculated by the flow time of the solution ($t_1$) and of the solvent ($t_0$), for example, by means of an Ostwald viscosimeter.

Examples of polyesters found to be suitable in accordance with the present invention are shown in Table 1.

TABLE I

| No. | Polyester | $(Z\eta)_{c=1}$ | Molecular weight |
|---|---|---|---|
| 1 | Hydrox poly-1,6-hexanediol sebacate | 1.61 | about 35,000 |
| 2 | ---do--- | 2.36 | about 70,000 |
| 3 | Hydroxypoly-1,4-butanediol sebacate | 1.68 | about 50,000 |
| 4 | Hydroxypoly-1,6-hexanediol azelate | 1.90 | about 40,000 |
| 5 | Hydroxypoly-1,4-butanediol azelate | 1.23 | about 25,000 |

The hydroxypolyester plasticizers of this invention are advantageously incorporated in homopolymers of vinyl chloride as well as copolymers wherein vinyl chloride is a major constituent thereof. Suitable copolymers include those containing, for example, 80–95% vinyl chloride and 20–5% vinyl acetate or other monomers copolymerizable with vinyl chloride such as vinylidene chloride.

In general, the polyesters of this invention are suitable as plasticizers for all copolymers containing at least 60% by weight, preferably 80 to 90% by weight, of vinyl chloride.

Plasticization of polymers of vinyl chloride can be accomplished by employing any of the conventional mixing techniques used in compounding thermoplastic compositions. For example, compounding can be satisfactorily accomplished on mixing rollers, kneading apparatus, etc. Plastic masses, such as rolled sheets, granulates, etc., prepared in this manner can then be formed into shaped articles with equipment such as screw presses, injection molding machines and calenders.

Other materials which can be incorporated into the plasticized polymers of vinyl chloride include fillers, lubricants, dyes, and stabilizers against heat and the influence of light. When preparing the plastic masses described in the present invention, anti-oxidants, such as alkyl, aryl and mixed alkyl-aryl phosphites can also be utilized with particular advantage in addition to the aforementioned agents.

The polymers of vinyl chloride plasticized with polyesters having terminal hydroxy groups in accordance with this invention are extremely well suited in the manufacture of conduits designed to carry petrochemicals, as well as packing tubes. Due to their excellent resistance against many solvents, mineral oils, and vegetable and animal oil and fats, the plasticized polymers of the present invention are particularly well suited for use in the manufacture of wrapping foils for use for fat-containing foodstuffs. Combined with their outstanding lack of odor and tastelessness, the resistance of vinyl chloride polymers plasticized with the polyester plasticizer of the present invention against solvents is advantageous in many applications.

Additionally, deformation of these plasticized polymers due to creep is very slight, and these polymers are therefore useful in the packing and wrapping fields. The polymers are also particularly adapted for use in synthetic laminated materials wherein softened polyvinyl chloride is a constituent, as well as softened polyvinyl chloride polymerizates which come into intimate contact with other highly polymeric substances. With the polyesters having terminal hydroxy groups prepared according to the present invention, it is possible to produce, for the first time, plasticized polymers of vinyl chloride characterized by an extremely low volatility, low tendency to creep, excellent solvent extraction stability and a high cold impact strength or resistance.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Into a 500 ml. reaction vessel which has been purged with nitrogen are charged 0.65 mole of sebacic acid, 1.43 moles of 1,6-hexanediol, and 0.008 mole of tetrabutyl titanate catalyst. The reactants are maintained at a temperature of between 175° to 225° C. while stirring and water formed during the reaction is removed through a discharge port provided in the upper portion of the reaction vessel. The reaction is continued for about 4 hours until the acid number of the resultant polyester is 1.2.

The resultant polyester is then polycondensed in a reaction vessel maintained at a temperature of from 260° C. to 270° C. and under a vacuum of about 0.1 to 1 mm. of mercury for 5 hours until the viscosity number is 1.61. The obtained hydroxypoly-1,6-hexanediol sebacate melts at 70.5–73° C. It has a molecular weight of about 35,000 and is solid and crystalline up to about 70° C.

EXAMPLE 2

Utilizing the apparatus of Example 1, there are reacted 0.65 mole of sebacic acid, 1.4 moles of 1,4-butanediol, and 0.008 mole of tetrabutyl titanate catalyst at a temperature of 145° to 220° C. while stirring. The reaction is continued for 6 hours until the acid number of the resultant ester is about 6.9. The resultant polyester is then polycondensed at a temperature of from 260° to 270° C. and under a vacuum of between 0.1 and 1 mm. of mercury for 6½ hours until the viscosity thereof is 1.68. The thus-produced hydroxypoly-1,4-butanediol sebacate exhibits a melting point of 62° C. and has a molecular weight of about 50,000. It is solid and crystalline up to about 62° C.

EXAMPLE 3

In a reaction vessel identical to that described in Example 1, 0.65 mole of azelaic acid, 1.4 moles of 1,4-butanediol and 0.008 mole of tetrabutyl titanate are reacted, while stirring, at 150–220° C. The reaction is conducted for about 5–6 hours, until an acid number of about 5.0 has been attained. The thus-produced ester is then polycondensed at 260–270° C. under a vacuum of 0.1–1 mm. of mercury for 5 hours until a viscosity number of 1.23 is reached. The obtained hydroxypoly-1,4-butanediol azelate has a melting point range of 45–55° C. It has a molecular weight of approximately 25,000 and is solid and crystalline up to 45° C.

EXAMPLE 4

A plasticized resinous mass is prepared by homogenizing for 10 minutes at 175° C. on a set of mixing rolls the following components:

*Plasticizer*

30 grams of the hydroxypoly-1,6-hexanediol sebacate produced in Example 1.

*Resinous mixture*

| | Grams |
|---|---|
| Suspension-polyvinyl chloride having a K value of 70 | 70.0 |
| A complex barium-cadmium stearate (Adva-rod BC 26) | 1.4 |
| Trinonylphenyl phosphite | 0.2 |
| and | |
| Stearic acid | 0.5 |

After mixing for 10 minutes, the plasticized mass is removed from the mixing rollers as a foil and is subsequently treated in a heated press to form transparent and highly lustrous foils 0.5 mm. in thickness. The plasticized foil produced in this manner exhibits a tensile strength of 273 kg./cm.², an elongation at rupture of 310%, and a cold compact rupture temperature of −35° C. The cold impact rupture temperature is determined in accordance with DIN 53,372.

After standing for 4 weeks in a high humidity atmosphere, the foil exhibits no signs of incompatibility with the plasticizer. Even after 6 months of storage at room temperature, no changes in the foil are detected.

*Solvent stability*

Round disks prepared from the above-mentioned polyvinyl chloride mixture having a diameter of 7.5 mm. and a thickness of 0.5 mm. are examined as to weight changes when treated as follows:

| | Percent |
|---|---|
| (A) Weight loss due to extraction with soybean oil over a period of 7 days at 20° C. | 0.05 |
| (B) Weight loss due to extraction with benzene-toluene (70:30 mixture) for 1 hour at 25° C. | 1.3 |

EXAMPLE 5

The resinous mixture described in Example 4 is plasticized with 30 grams of the hydroxypoly-1,4-butanediol sebacate produced in Example 2. There is obtained a transparent foil having the following properties:

| | |
|---|---|
| Tensile strength _____kg./cm.² | 261 |
| Elongation at rupture _____percent | 290 |
| Cold impact rupture _____° C. | −35 |
| (A) Weight loss due to extraction with soybean oil over seven days at 20° C. _____percent | 0.02 |
| (B) Weight loss due to extraction with benzene-toluene (70:30) for 1 hour at 25° C. ___do | 0.9 |

After standing for a period of one year, the foil produced in this manner exhibits no sign of incompatibility with the plasticizer.

EXAMPLE 6

A resinous mixture composed of the following:

| | Grams |
|---|---|
| Suspension-polyvinyl chloride having a K value of 70 | 65.0 |
| A complex barium-cadmium soap (Adva-rod BC 26) | 1.3 |
| Trinonylphosphite | 0.2 |
| and | |
| Stearic acid | 0.5 | is plasticized as in Example 4 with 35.0 grams of hydroxypoly-1,6-hexanediol sebacate having a melting point of 73–86° C., and a viscosity number $(Z_\eta)_{c=1}$ of 2.36. There is produced a foil having the following mechanical properties:

| | |
|---|---|
| Tensile strength _____kg./cm.² | 226 |
| Elongation at rupture _____percent | 306 |
| Cold impact rupture temperature _____° C. | −50 |

EXAMPLE 7

Plasticized polyvinyl chloride is prepared by homogenizing the formulations shown in Table 2 for 10 minutes at 175° C. on a set of mixing rollers. The resultant plastic masses are drawn off the mixing rollers and subsequently processed with a heated press to give transparent, highly lustrous and ductile foils 0.5 mm. in thickness. The properties thereof are shown in Table 3. With plasticized mass B, the polyvinyl chloride gels, but the polyester exudes therefrom after a very short time, showing that hydroxypolyesters of azelaic acid having an insufficiently high molecular weight are incompatible with polyvinyl chloride.

TABLE 2

| Formulation | Amount (grams) | | |
|---|---|---|---|
| | A | B | C |
| Polyvinyl chloride having a K value of 70 | 65.0 | 70.0 | 65.0 |
| Barium-Cadmium stearate stabilizer (Adva-rod BC 12) | 0.65 | 0.70 | 0.65 |
| Hydroxypoly-1,6-hexanediol azelate melting between 53–69° C. and having a viscosity number $(Z\eta)_{c=1}$ of 1.9 | 35.0 | | |
| Hydroxypoly-1,4-butanediol azelate melting between 46–51° C. and having a viscosity number $(Z\eta)_{c=1}$ of 0.56 | | 30.0 | |
| Hydroxypoly-1,4-butanediol azelate melting between 45–55° C. and having a viscosity number $(Z\eta)_{c=1}$ of 1.23 | | | 35.0 |

TABLE 3

| Properties | A | B | C |
|---|---|---|---|
| Resistance to tearing (shear), kp./cm.² | 187.0 | | 198.0 |
| Tearing elongation, percent | 370 | | 280 |
| Weight loss upon storage for more than one hour at 25° C. in benzene-toluene (1:1), percent | 1.6 | | 1.0 |
| Weight loss upon storage for 7 days in soybean oil | (¹) | | (¹) |

¹ No loss.

EXAMPLE 8

The polyvinyl chloride resinous mixture shown in Example 4 is plasticized with 30 grams of a hydroxypoly-1,4-butanediol sebacate having a melting point of 36.5° C. and a viscosity number $(Z_\eta)_{c=1}$ of 0.361. The plasticized polyvinyl chloride gels, but after standing several weeks at room temperature, the polyester migrates to the surface of the polymer.

EXAMPLE 9

The polyvinyl chloride resinous mixture of Example 4 is homogenized with 30.0 grams of hydroxypoly-1,6-hexanediol sebacate having a melting point of 64–71.5° C. and a viscosity number $(Z_\eta)_{c=1}$ of 0.575. The plasticizer in the produced foils, 0.5 mm. in thickness, migrates to the surface thereof after two weeks of storage at room temperature, thus indicating that polyesters having a molecular weight under 20,000 are therefore incompatible with polymers of vinyl chloride.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:

1. In a method for the manufacture of a plasticized polymer of vinyl chloride, the improvement which comprises incorporating in a polymer of vinyl chloride, said polymer containing vinyl chloride as the major constituent thereof, at least 60% by weight of vinyl chloride, a polyester having a molecular weight between 20,000 and 80,000 and produced by the reaction between an acid selected from the group consisting of sebacic acid, azelaic acid and mixtures thereof and a dihydric alcohol selected from the group consisting of 1,4-butanediol, 1,6-hexanediol and mixtures thereof.

2. The method as defined by claim 1, wherein said polyester is solid and crystalline within a temperature range of from about 45° to 110° C., depending upon the molecular weight thereof.

3. The method as defined by claim 1, wherein the molecular weight of said polyester is between 30,000 and 50,000.

4. The method as defined by claim 1, wherein said plasticized polymer contains from 0.4 to 3 moles of polyester per mole of the polymer of vinyl chloride.

5. The method as defined by claim 1, wherein said polymer of vinyl chloride is polyvinyl chloride.

6. The method as defined by claim 1, wherein the polymer of vinyl chloride contains from 80 to 95% by weight of vinyl chloride and from 20 to 5% by weight of vinyl acetate.

7. The method as defined by claim 1, wherein said polyester has a specific viscosity between 1.2 and 3 as measured at 25° C. in a phenol-tetrachloroethane mixture having a weight ratio of 60:40.

8. A plasticized polymer of vinyl chloride, said polymer containing vinyl chloride as the major constituent thereof, at least 60% by weight of vinyl chloride, and as a plasticizer therefor a polyester having a molecular weight between 20,000 and 80,000 and being produced by the reaction between an acid selected from the group consisting of sebacic acid, azelaic acid and mixtures thereof and a dihydric alcohol selected from the group consisting of 1,4-butanediol, 1,6-hexanediol and mixtures thereof.

9. The plasticized polymer as defined by claim 8, wherein the polyester is solid and crystalline within a temperature range of from about 45° to 110° C., depending upon the molecular weight thereof.

10. The plasticized polymer as defined by claim 8, wherein the said plasticized polymer contains from 0.4 to 3 moles of polyester per mole of the polymer of vinyl chloride.

11. The plasticized polymer as defined by claim 8, wherein the molecular weight of said polyester is between 30,000 and 50,000.

12. The plasticized polymer as defined by claim 8, wherein said polymer of vinyl chloride is polyvinyl chloride.

13. The plasticized polymer as defined by claim 8, wherein said polymer of vinyl chloride contains from 80 to 95% by weight of vinyl chloride and from 20 to 5% by weight of vinyl acetate.

14. The plasticized polymer as defined by claim 8, wherein said polyester has a specific viscosity between 1.2 and 3 as measured at 25° C. in aphenol-tetrachloroethane mixture having a weight ratio of 60:40.

References Cited

UNITED STATES PATENTS 3,091,597  5/1963  Henriques _____ 260—31.6

FOREIGN PATENTS 447,049  3/1948  Canada.
586,826  4/1947  Great Britain.

MORRIS LIEBMAN, *Primary Examiner.*

J. FROME. *Assistant Examiner.*